(12) United States Patent
Wagner et al.

(10) Patent No.: US 11,346,065 B2
(45) Date of Patent: *May 31, 2022

(54) SELF-PROPELLED CONSTRUCTION MACHINE AND METHOD FOR WORKING GROUND PAVEMENTS (71) Applicant: Wirtgen GmbH, Windhagen (DE)

(72) Inventors: Stefan Wagner, Bad Honnef (DE); Markus Bach, Bonn (DE); Axel Mahlberg, Hennef (DE); Markus Schäfer, Asbach/Hussen (DE); Eduard Fitz, Hennef (DE)

(73) Assignee: Wirtgen GmbH

( * ) Notice: Subject to any disclaimer, the term of this patent is extended or adjusted under 35 U.S.C. 154(b) by 0 days.

This patent is subject to a terminal disclaimer.

(21) Appl. No.: 16/897,512

(22) Filed: Jun. 10, 2020

(65) Prior Publication Data
US 2021/0016661 A1 Jan. 21, 2021

(30) Foreign Application Priority Data

Jul. 18, 2019 (DE) ..................... 10 2019 210 644.7

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *E02F 3/84* (2013.01);
(Continued)

(58) Field of Classification Search
CPC .... E01C 23/088; E01C 23/127; E01C 23/065; E02F 3/84; E02F 9/22; E02F 9/2221;
(Continued)

(56) References Cited

U.S. PATENT DOCUMENTS 7,547,981 B2 6/2009 Savant et al.
7,841,442 B2 11/2010 Berg et al.
(Continued)

FOREIGN PATENT DOCUMENTS

DE 10303206 A1 7/2004
DE 102008007184 A1 10/2008
(Continued)

OTHER PUBLICATIONS

European Search Report for corresponding patent application No. 20182305.1, dated Nov. 26, 2020, 8 pages (not prior art).

*Primary Examiner* — Abby J Flynn
*Assistant Examiner* — Michael A Goodwin
(74) *Attorney, Agent, or Firm* — Gary L. Montle; Lucian Wayne Beavers; Patterson Intellectual Property Law, PC (57) ABSTRACT

A self-propelled construction machine comprises a machine frame, at least three travelling devices, at least one hydraulic drive system for driving at least two travelling devices, wherein the hydraulic drive system comprises at least one controllable hydraulic motor with variable displacement volume and at least one hydraulic pump, at least one working device (e.g. a milling drum), for working the ground pavement. A detection device detects fluctuations in the longitudinal speed of the construction machine during movement thereof, wherein a control unit alters the displacement volume of the at least one controllable hydraulic motor as a function of the detected fluctuations so that the natural frequency of the hydraulic drive system is altered, wherein the control unit adjusts the discharge volume of the pump as a function of the amount of adjustment of the displacement volume in such a fashion that the specified drive speed remains constant.

19 Claims, 3 Drawing Sheets

(51) Int. Cl.
*E02F 3/84* (2006.01)
*E02F 9/22* (2006.01)
*B60K 31/06* (2006.01)
*E21C 25/10* (2006.01)
*E21C 29/22* (2006.01)

(52) U.S. Cl.
CPC ............ *B60K 31/06* (2013.01); *B60Y 2200/41* (2013.01); *B60Y 2300/18* (2013.01); *B60Y 2400/30* (2013.01); *E02F 9/2296* (2013.01); *E21C 25/10* (2013.01); *E21C 29/22* (2013.01)

(58) Field of Classification Search
CPC ..... E02F 9/2232; E02F 9/2235; E02F 9/2253; E02F 9/2278; E02F 9/2296; E21C 47/00; E21C 25/10; E21C 29/22; B60W 20/10; F16H 61/4183; F16H 61/452; B60K 3/06; B60Y 2200/41; B60Y 2300/18; B60Y 2400/30
See application file for complete search history.

(56) References Cited

U.S. PATENT DOCUMENTS

| | | | |
|---|---|---|---|
| 9,347,554 | B2 | 5/2016 | Metzger et al. |
| 2009/0035064 | A1 | 2/2009 | Holl et al. |
| 2010/0021234 | A1* | 1/2010 | Willis ................. B62D 7/1509 404/90 |
| 2011/0126533 | A1* | 6/2011 | Noll ....................... F16H 61/47 60/431 |
| 2013/0257136 | A1 | 10/2013 | Held et al. |
| 2014/0026548 | A1 | 1/2014 | Vigholm et al. |
| 2014/0260221 | A1 | 9/2014 | Metzger et al. |
| 2016/0208898 | A1* | 7/2016 | Caldwell ............... F03C 1/0531 |
| 2018/0058020 | A1* | 3/2018 | Berning ................ E01C 23/088 |

FOREIGN PATENT DOCUMENTS

| | | |
|---|---|---|
| DE | 102013113205 A1 | 5/2015 |
| EP | 2644775 A2 | 10/2013 |
| WO | 03064770 A1 | 8/2003 |

* cited by examiner

SELF-PROPELLED CONSTRUCTION MACHINE AND METHOD FOR WORKING GROUND PAVEMENTS

CROSS-REFERENCES TO RELATED APPLICATIONS

This application claims benefit of German Patent Application No. 10 2019 210 644.7, filed Jul. 18, 2019, and which is hereby incorporated by reference.

FIELD OF THE INVENTION

The invention relates to a self-propelled construction machine, more particularly to a road milling machine, recycler, stabilizer, or surface miner, as well as to a method for working ground pavements using a self-propelled construction machine.

BACKGROUND

Self-propelled construction machines are known, in particular road milling machines, recyclers, stabilizers or surface miners, comprising a machine frame, at least three travelling devices, at least one hydraulic drive system for driving at least two travelling devices, wherein the hydraulic drive system comprises at least one controllable hydraulic motor with variable displacement volume, and at least one hydraulic pump with variable discharge volume, and at least one working device, in particular a milling drum for working a ground surface.

The road milling machines can be used, for example, to remove existing ground pavements of roads. Recyclers can be used to rehabilitate existing ground pavements. The stabilizers serve the purpose of preparing the subgrade for road construction. Surface miners can be used to remove coal and rock.

Experience has shown, however, that vibrations may occur during the operation of the construction machines caused by, for example, a non-smooth operation of the working device or the travelling devices. This may lead to an excitation of vibrations in the entire construction machine to the point of the machine rocking, in particular if the vibrations occur in the range of the resonant frequency of the machine's hydraulic drive system. According to prior art, such rocking of the machine is prevented by the machine operator changing the speed of the construction machine and driving more slowly. This has the disadvantage, however, that the machine is not operated or cannot be moved at the desired speed, and that, as a consequence, the construction machine is not optimally utilized.

BRIEF SUMMARY

An object of the present invention to create a construction machine and a method for working ground pavements in which rocking of the construction machine is avoided, or optimized operation of the construction machine is made possible, respectively.

The invention advantageously provides for a detection device to be provided, which detects fluctuations in the longitudinal speed of the construction machine during movement of the construction machine, wherein a control unit alters the displacement volume of the at least one controllable hydraulic motor as a function of the detected fluctuation so that the natural frequency or resonant frequency, respectively, of the hydraulic drive system of the construction machine is altered, wherein the control unit adjusts the discharge volume of the pump as a function of the amount of adjustment of the displacement volume in such a fashion that the specified drive speed remains constant.

The present invention has the advantage that rocking of the machine is avoided by adjusting the displacement volume of the controllable hydraulic motor, since the natural frequency of the hydraulic drive system is altered. Furthermore, the specified drive speed remains constant as a result of the discharge volume of the pump being adjusted in accordance with the adjustment of the displacement volume of the at least one hydraulic motor.

It is therefore no longer necessary to reduce the set speed of the construction machine, and the construction machine may be operated at the desired set speed.

In the present invention, at least two travelling devices are preferably driven. It is, however, also possible for only two travelling devices to be driven and further non-driven travelling devices to be additionally provided.

The hydraulic drive system comprises at least one hydraulic pump. Furthermore, at least one controllable hydraulic motor is provided. Preferably, one controllable hydraulic motor is provided on each travelling device. The displacement volume of the controllable hydraulic motor may be variably adjusted.

In addition, the discharge volume of the hydraulic pump may be adjustable.

A tank is preferably provided for the hydraulic fluid. The hydraulic pump discharges hydraulic fluid from the tank via hydraulic lines to the hydraulic motors. The hydraulic motors drive the travelling devices.

The natural frequency or resonant frequency $\omega_0$ of the hydraulic drive system of the construction machine is as follows:

$$\omega_0 = \frac{V_M}{2\pi} \frac{1}{\sqrt{C'_h J_{total}}}$$

Herein, $C'_h$ is the hydraulic capacity, $J_{total}$ is the mass moment of inertia of the road milling machine acting on the hydraulic motors, and $V_M$ is the total displacement volume of the hydraulic motors.

The natural frequency of the hydraulic drive system can thus be adjusted by adjusting the displacement volume on the at least one hydraulic motor.

Adjusting the displacement volume on the at least one hydraulic motor would, however, in the case of a consistent flow rate, lead to an altered speed of revolution on the hydraulic motor. The discharge volume of the pump is therefore adjusted, as a function of the amount of adjustment of the displacement volume, in such a fashion that the specified drive speed remains constant.

The hydraulic motors are preferably operated at maximum swivel during operation.

If the detection device detects fluctuations in the longitudinal speed of the construction machine, the displacement volume of the at least one hydraulic motor is altered. The displacement volume is reduced in the case of a hydraulic motor operated at maximum swivel.

The discharge volume of the hydraulic pump is altered simultaneously or shortly thereafter, since an alteration of the speed of revolution in the hydraulic motor would otherwise result. In the case of a reduced displacement volume of the hydraulic motor, the discharge volume would also be reduced, since a smaller displacement volume at the same flow rate would otherwise mean an increased speed of revolution.

It is also possible to monitor or limit the pressure, respectively. The pressure level in the system increases by swivelling back the hydraulic motors. If, in the process, a specified permissible maximum pressure of the system is exceeded, the displacement volume of the motors may be increased again in order to reduce the hydraulic pressure in the system; this may, however, result in the renewed occurrence of the unwelcome vibrations. Alternatively, the flow rate of the hydraulic pumps may be reduced in order to reduce the hydraulic pressure; this will, however, lead to a reduction in the longitudinal speed of the construction machine.

For the purpose of altering the natural frequency of the construction machine, the control unit may preferably reduce the displacement volume of the at least one controllable hydraulic motor.

The fluctuations in the longitudinal speed of the construction machine may be detectable as a vibration by means of the detection device, wherein said vibration preferably exhibits an essentially fixed frequency.

The control unit may control the hydraulic drive system in such a fashion that the displacement volume of the at least one hydraulic motor and the discharge volume of the hydraulic pump are adjusted simultaneously. Alternatively, they may also be adjusted successively.

In the present invention, it must be differentiated between the longitudinal speed of the construction machine, the set speed, and the specified drive speed. The longitudinal speed is the actual speed of the construction machine. The set speed is the speed which the operator of the construction machine can set on the operating unit. It must be distinguished from the specified drive speed in the hydraulic drive system. This is the drive speed specified by the control unit. The longitudinal speed of the construction machine is a superimposition of the specified drive speed and influencing factors of the machine or the environment. The specified drive speed may thus be superimposed by fluctuations which are caused, for example, by a non-smooth operation of the working device. The specified drive speed is the speed that would ensue in the case of given operating parameters of the hydraulic drive system and without any influencing factors.

In the case of a reduced displacement volume and simultaneously reduced discharge volume, a higher pressure results in the hydraulic drive system which, in an ideal system, would also lead to a consistent speed. In a non-ideal system, however, losses may occur; as a result of the higher pressure, for example, losses may also occur due to leakages.

The speed could therefore be reduced despite consistent volume ratios of pump and motor.

The control unit may verify as to whether the detected longitudinal speed deviates from the specified drive speed, and the control unit may, in the case of a deviation of the detected longitudinal speed from the specified drive speed, adjust the discharge volume of the hydraulic pump in such a fashion until the detected longitudinal speed corresponds to the specified drive speed.

The discharge volume may thus be adjusted as a function not only of the amount of adjustment of the displacement volume but also of the actually detected travelling speed so that the longitudinal speed corresponds to the specified drive speed.

Alternatively, data or characteristic curves may be stored in a data storage device which show the correlation between the pressure in the hydraulic drive system and speed losses, wherein a pressure detection device detects the pressure in the hydraulic drive system, and wherein the control unit adjusts the discharge volume of the hydraulic pump as a function of the detected pressure in such a fashion that the speed losses are compensated for and the longitudinal speed corresponds to the specified drive speed. As a further alternative, a characteristic map may also be stored which reflects the correlation between speed, discharge volume of the pump, displacement volume of the hydraulic motors and speed losses. In this case, the speed losses may also be determined without additional detection, since the speed, the discharge volume and the displacement volumes are known. The control unit may therefore adjust the discharge volume of the hydraulic pump as a function of the stored characteristic map in such a fashion that the speed losses are compensated for and the longitudinal speed corresponds to the specified drive speed.

Closed-loop control of the travelling speed may therefore also be effected based on stored data or based on a stored characteristic curve which indicates the correlation between operating pressure and speed losses. The discharge volume may then be adjusted accordingly.

Speed losses are understood as losses due to leakages or similar and mean that the specified drive speed is not actually reached and the longitudinal speed is different. The speed losses are the difference between the specified drive speed and the actual longitudinal speed. Due to the stored data or characteristic curves, respectively, it is known for a system how high the speed losses are at a specific pressure. These may be established, for example, by means of trials and stored in a data storage device as characteristic curves or data.

The control unit may control the hydraulic drive system in such a fashion that the displacement volume of the at least one controllable hydraulic motor is altered only when the detected vibration exceeds a predefined amplitude.

The detection device may detect fluctuations in the longitudinal speed on the travelling devices or on the machine frame and/or as a fluctuation in the volumetric flow rate and/or fluctuations in the pressure of the hydraulic drive system.

The detection device, which detects the longitudinal speed, may comprise a pick-up sensor and/or an accelerometer for measuring the changes in speed and/or a measuring device for measuring the fluctuations in pressure or the volumetric flow rate in the hydraulic drive system.

According to the present invention, a method for working ground pavements using a construction machine self-propelled by means of travelling devices, in particular road milling machine, recycler, stabilizer or surface miner, may furthermore be provided, in which the travelling devices are driven by a hydraulic drive system, wherein the hydraulic drive system comprises at least one controllable hydraulic motor with variable displacement volume and at least one hydraulic pump, wherein a working device, in particular a milling drum, works the ground pavement. It is advantageously provided that, during movement of the construction machine, fluctuations in the longitudinal speed of the construction machine are detected and the displacement volume of the at least one controllable hydraulic motor is altered, as a function of the detected fluctuation, in such a fashion that the natural frequency of the hydraulic drive system of the construction machine is altered, wherein the discharge volume of the pump is adjusted, as a function of the amount of adjustment of the displacement volume, in such a fashion that the specified drive speed remains constant.

The fluctuations in the longitudinal speed of the construction machine may be detected as vibrations, wherein said vibrations preferably exhibit an essentially fixed frequency.

For the purpose of altering the natural frequency of the construction machine, the displacement volume of the at least one controllable hydraulic motor may be reduced.

The displacement volume of the at least one hydraulic motor and the discharge volume of the hydraulic pump may be adjusted simultaneously.

After adjusting the displacement volume and the discharge volume, it may be verified as to whether the detected longitudinal speed deviates from the specified drive speed and, in the case of a deviation, the discharge volume of the hydraulic pump adjusted in such a fashion until the detected longitudinal speed corresponds to the specified drive speed.

Alternatively, after adjusting the displacement volume and the discharge volume, the pressure in the hydraulic drive system may be verified and, as a function of the pressure and data stored in a data storage device which show the correlation between the pressure in the hydraulic drive system and speed losses, the discharge volume adjusted in such a fashion that the speed losses are compensated for.

By compensating for the speed losses, the actual longitudinal speed then corresponds to the specified drive speed.

BRIEF DESCRIPTION OF THE SEVERAL VIEWS OF THE DRAWINGS

Hereinafter, embodiments of the invention are illustrated in more detail with reference to the drawings.

The following is shown schematically.

DETAILED DESCRIPTION

Figure 1:
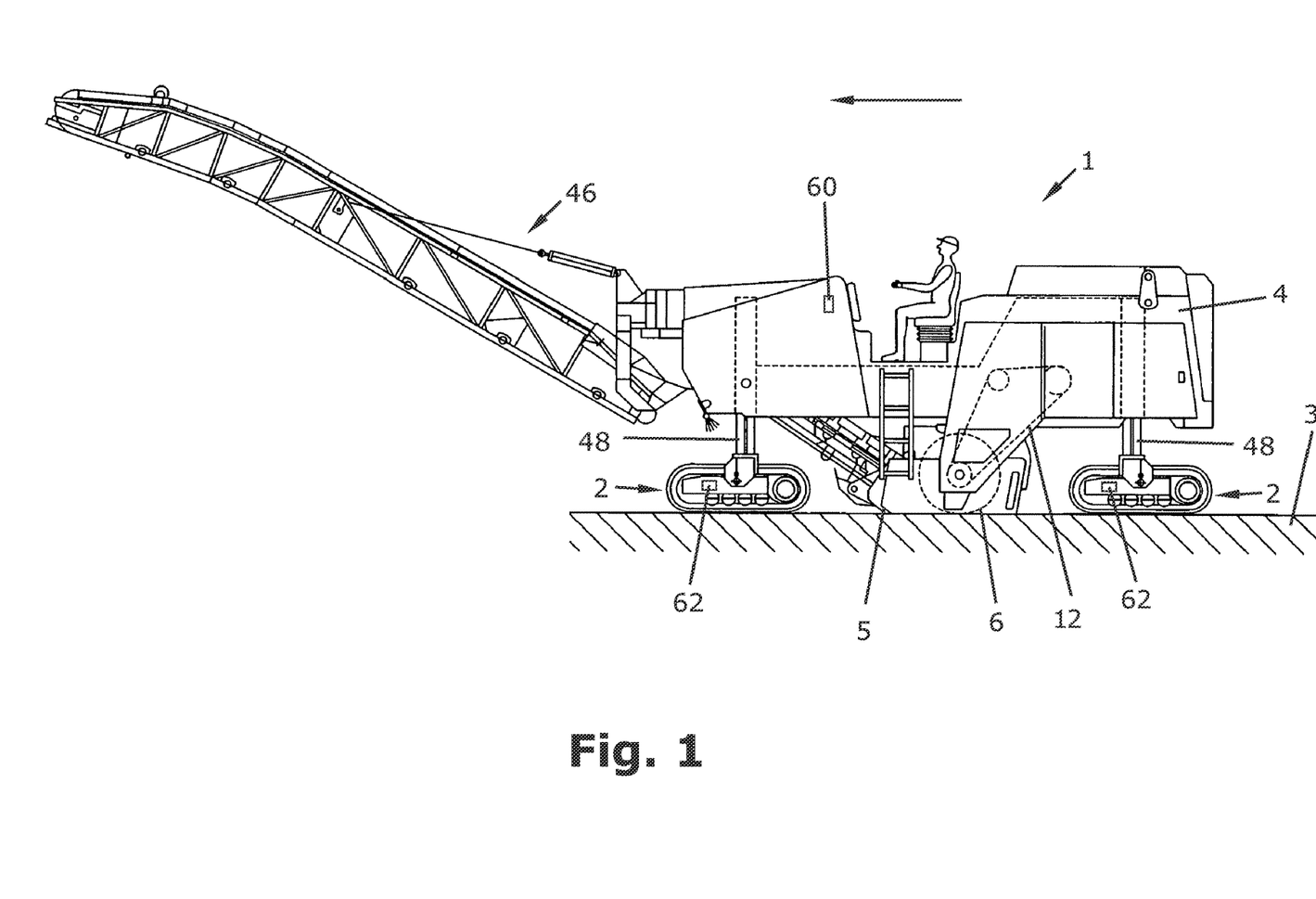
FIG. 1 shows a self-propelled construction machine in side view.

FIG. 1 shows a construction machine 1. The construction machine 1 may be a milling machine, in particular, a road milling machine, a recycler or stabilizer, or a surface miner. The construction machine depicted in FIG. 1 has the form of a road milling machine. The construction machine 1 may, however, also be any other construction machine comprising, as a minimum, a hydraulic drive system and a working device. The depicted construction machine 1 comprises travelling devices 2 which support a machine frame 4. The travelling devices 2 may be tracked ground-engaging units or wheels. A working device, preferably a milling drum 6, for working the ground pavement 3 is mounted on the machine frame 4. For the purpose of working the ground pavement, the milling drum 6 may comprise non-depicted milling tools on the shell surface of the milling drum 6. A milling drum housing 5 is arranged around the milling drum 6. The construction machine 1 furthermore preferably comprises a conveying device 46 for transporting away the milling material. In the embodiment depicted, the conveying device 46 is a transport conveyor.

The travelling devices 2 may be connected to the machine frame 4 via lifting columns 48. The machine frame 4 may be adjustable in height by means of the lifting columns 48. As a result, the milling drum 6 may also be adjusted in height. Alternatively or additionally, the milling drum 6 may, in turn, be mounted in a movable, in particular height-adjustable fashion relative to the machine frame 4. The lifting columns 48 may be provided on all travelling devices 2. The lifting devices 48 may, however, also be arranged, for example, only on the rear ground-engaging units.

Figure 2:
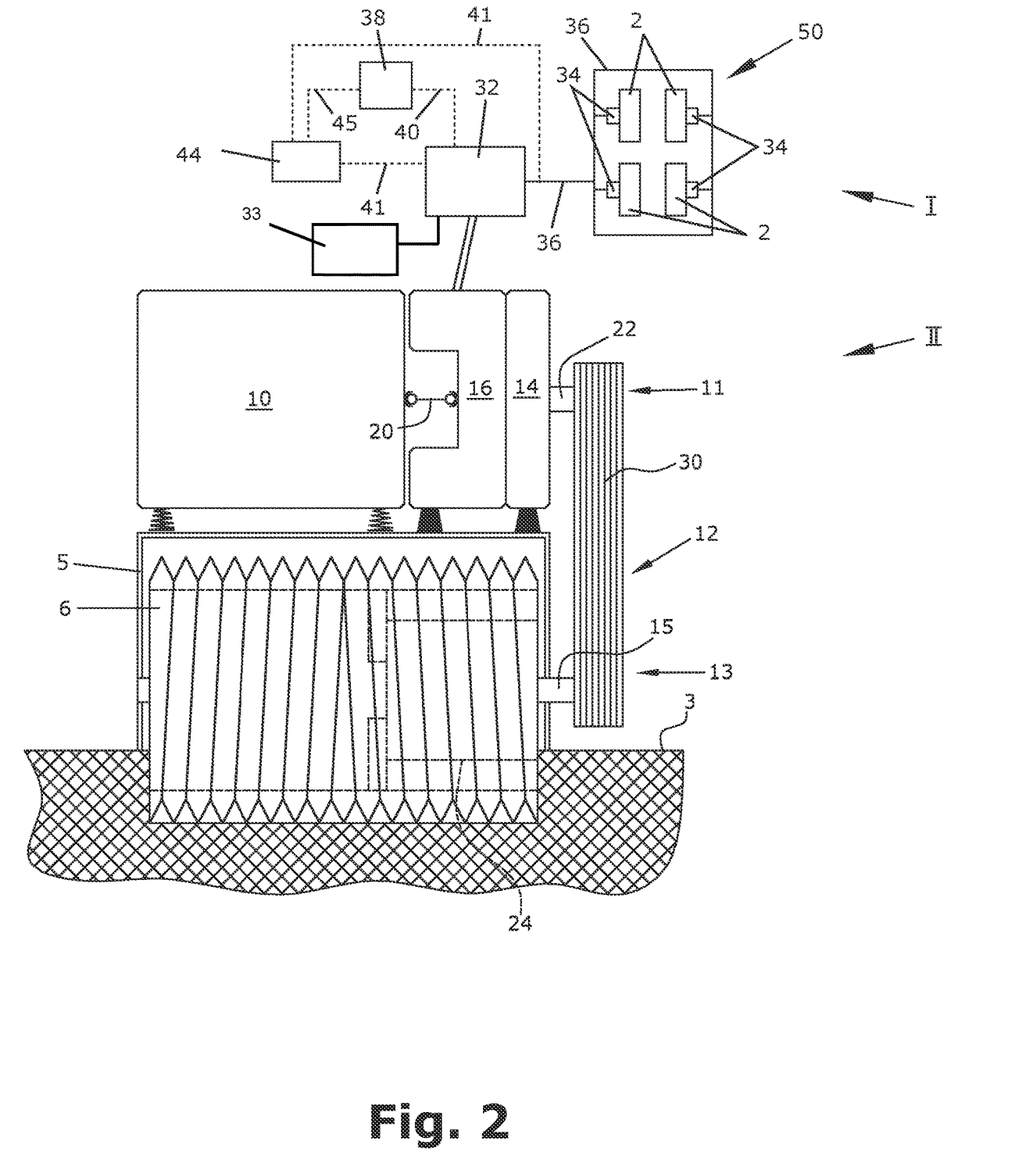
FIG. 2 shows drive trains of the construction machine.

FIG. 2 shows a drive train of the construction machine 1. A first drive train I serves the purpose of transmitting the driving power to the travelling devices 2, while a second drive train II serves the purpose of transmitting the driving power to the milling drum 6.

FIG. 2 shows a drive unit 10. Said drive unit may preferably be a combustion engine. Said combustion engine may, in particular, be a diesel engine. The drive unit may be provided, via an elastomer coupling 20, with a pump transfer gearbox 16 for driving the first drive train I for driving a hydraulic drive system 50 for driving, inter alia, the travelling devices 2.

In the second drive train II for driving the milling drum 6, a clutch 14 may be provided between the drive unit 10 and the milling drum 6. Said clutch 14 is a device for switching the torque.

A traction mechanism 12 for the mechanical drive of the milling drum 6 may be arranged between the clutch 14 and the milling drum 6. The traction mechanism 12 comprises a drive element 11 which is coupled, in a torsionally rigid fashion, to the drive shaft 22 of the drive unit 10. The traction mechanism 12 furthermore comprises a drive element 13 which is coupled, in a torsionally rigid fashion, to the drive shaft 15 of the milling drum 6. A gearbox, in particular, a planetary gearbox 24, may additionally be arranged between the drive shaft 15 and the milling drum 6.

The traction mechanism 12 is preferably a belt drive, wherein the drive elements and driven elements consist of belt pulleys 11 and 13, with one or a plurality of drive belts 30 running over said belt pulleys 11 and 13, wherein the drive elements and driven elements consist of sprockets. In principle, the driving device may also be hydraulically or electrically driven.

In the first drive train I for driving the hydraulic drive system 50, the pump transfer gearbox 16 comprises at least one hydraulic pump 32. The at least one hydraulic pump 32 may in turn be connected, via hydraulic lines 36, to at least one or, as in the embodiment depicted, a plurality of hydraulic motors 34. The hydraulic motors 34 drive one each travelling device 2, depicted only schematically in FIG. 2.

Due to the hydraulic drive system 50, the advance speed of the construction machine may, in principle, be controlled independently of the speed of revolution of the drive engine.

The pump 32 is connected to a hydraulic tank 33. The discharge volume of the pump 32 is adjustable.

The displacement volumes of the hydraulic motors 34, which are used to drive the travelling devices 2, are also adjustable.

The hydraulic motors may preferably be hydraulic axial piston motors. The hydraulic pump may be a hydraulic axial piston pump.

During the operation of a construction machine 1, fluctuations may occur in the longitudinal speed of the construction machine. Said fluctuations may be detected by means of a detection device 44. A control unit 38 may alter the displacement volume of the at least one controllable hydraulic motor 34 as a function of the detected fluctuation so that the natural frequency of the hydraulic drive system 50 of the construction machine 1 is altered, wherein the control unit 38 adjusts the discharge volume of the pump 32 as a function of the amount of adjustment of the displacement volume in such a fashion that the specified drive speed remains constant.

The natural frequency, that is, the non-damped natural frequency of the hydraulic drive system 50 of the construction machine 1 is determined as follows:

$$\omega_0 = \frac{V_M}{2\pi} \frac{1}{\sqrt{C'_h J_{total}}}$$

Herein, $C'_h$ is the hydraulic capacity, $J_{total}$ is the mass moment of inertia of the road milling machine acting on the hydraulic motors, and $V_M$ is the total displacement volume of the hydraulic motors.

The hydraulic capacity and the mass inertia of the road milling machine are known parameters with known construction machines or can be easily determined, respectively. These may also be determined by means of tests. The natural frequency of the hydraulic drive system is altered by altering the displacement volume.

Fluctuations in the drive speed are not disturbing per se. Rocking of the machine occurs only when said continuous fluctuation meets the natural frequency of the hydraulic drive system of the construction machine 1. This is very detrimental to the driving comfort. Due to the natural frequency being altered by adjusting the displacement volume of the hydraulic drive motors, rocking of the machine does not occur. Adjustment of the displacement volume is preferably effected when the amplitude of the detected vibration of the drive speed exceeds a specified value.

The hydraulic motors 34 are preferably operated at maximum swivel during operation. To alter the natural frequency, the hydraulic motors 34 are preferably swivelled back. This means that the displacement volume is preferably reduced.

Simultaneously or shortly thereafter, however, the discharge volume of the hydraulic pump 32 is adjusted in such a fashion that the specified drive speed remains constant.

If the displacement volume of the hydraulic motors is preferably reduced, the speed of revolution of the hydraulic motors 34 would increase if the flow rate remained constant. This may be prevented, however, by reducing the discharge volume of the hydraulic pump 32. The control unit 38 preferably controls the hydraulic drive system 50 in such a fashion that the displacement volume of the at least one hydraulic motor 34 and the discharge volume of the hydraulic pump 32 are adjusted simultaneously.

The control unit 38 may furthermore verify as to whether the detected longitudinal speed deviates from the specified drive speed after adjusting the displacement volume and the discharge volume. The control unit may then, in the case of deviations, adjust the discharge volume of the hydraulic pump 32 in such a fashion until the detected longitudinal speed corresponds to the specified drive speed.

As the system is a non-ideal system, losses due to leakages occur as a result of the higher pressure in the hydraulic drive system, which leads to the actual longitudinal speed not corresponding to the specified drive speed. Said speed losses may be compensated for by further adjustment of the discharge volume of the hydraulic pump 32. In order to know the required amount of adjustment of the discharge volume of the hydraulic pump 32, the actual longitudinal speed may be detected and compared to the specified drive speed and, as a function thereof, the discharge volume of the hydraulic pump 32 adjusted until the actual longitudinal speed corresponds to the specified drive speed.

Alternatively, the pressure in the hydraulic drive system may also be measured by means of measuring devices 70. Data may be stored in a data storage device which, for example, reflect characteristic curves between the pressure in the drive system and speed losses. Based on said characteristic curves and the pressure measured, the discharge volume of the hydraulic drive system 50 may then be adjusted accordingly. It is, in this case, therefore not necessary to measure the actual drive speed.

Measuring devices 70, which are used to register the pressure in the hydraulic drive system, may also be used to register the exceedance of a permissible maximum pressure. Should the maximum pressure be exceeded, the displacement volume of the motors may be increased again in order to reduce the hydraulic pressure in the system; this may, however, lead to the renewed occurrence of the unwelcome vibrations. Alternatively, the flow rate of the hydraulic pumps may be reduced in order to reduce the hydraulic pressure; this will, however, lead to a reduction in the longitudinal speed of the construction machine 1.

That the control unit 38 controls the hydraulic drive system 50 via the pump 32 is depicted by means of the dashed line 40. The measured values of the detection device 44 may also be transmitted to the control unit 38. This is also depicted by means of a dashed line 45. The term "to control" is to be understood to mean that the detection device 44 records a measured value at least once, and the control unit 38 controls the hydraulic drive system 50 as a function of the detected fluctuation. It is to also be included, however, that the detection device records measured values a plurality of times, and the control device 38 controls the hydraulic drive system 50 as a function of the detected fluctuation. A feedback in the sense of a closed-loop control is therefore to also be included in the present term "to control".

The detection device 44 may detect the fluctuations on the travelling devices 2 and/or on the machine frame and/or as a fluctuation in the volumetric flow rate and/or as a fluctuation in the pressure of the hydraulic drive system.

In the embodiment depicted, the detection device 44 detects the fluctuations in the volumetric flow rate and/or the fluctuations in the pressure in the hydraulic drive system 50. The detection device 44 may measure the fluctuations at any position of the drive system 50, such as the hydraulic pump 32 or the hydraulic lines 36. This is also depicted by means of dashed lines 41. The control unit 38 may be part of the machine control system of the construction machine 1. The control unit 38 may, however, also be designed separately.

Figure 3:
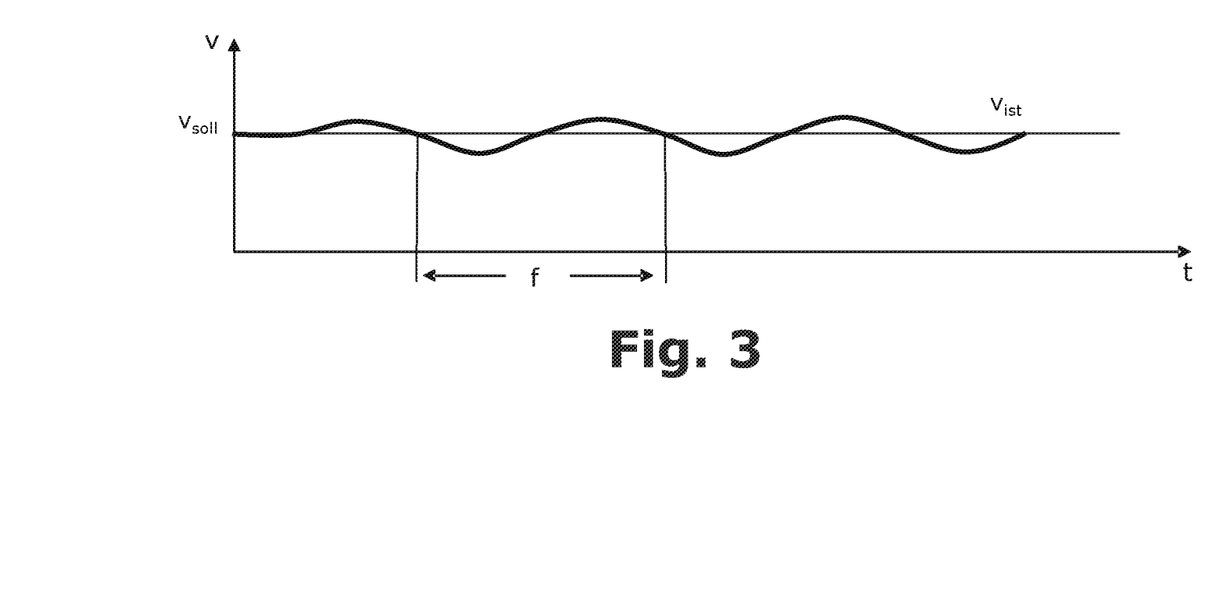
FIG. 3 shows vibration of the detected longitudinal speed.

FIG. 3 shows the longitudinal speed $v_{act}$ over time. The depicted detected longitudinal speed exhibits fluctuations which may fluctuate around a set speed $v_{set}$. The set speed $v_{set}$ is the speed which the driver can set on an operating unit. Ideally, the set speed corresponds to the specified drive speed $v_{drive}$. The detected fluctuations may, as depicted, be a vibration with a fixed frequency f. Rocking of the machine frequently occurs when said frequency f is in the range of the resonant frequency or natural frequency, respectively, of the hydraulic drive system of the construction machine 1.

In the prior art, said fluctuations could be counteracted only by adjusting the set speed $v_{set}$ in order to reduce the vibration which causes the machine to rock. This has the disadvantage, however, that the construction machine is moved more slowly altogether than would generally be possible due to the available machine power.

In the present invention, however, the natural frequency of the hydraulic drive system 50 of the construction machine 1 is altered by adjusting the displacement volume on the hydraulic motors 34. Rocking can thus also be prevented. By simultaneously or successively adjusting the discharge volume of the hydraulic pump, it can be ensured that the specified drive speed remains constant.

Additional or alternative detection devices are depicted in the construction machine according to FIG. 1. A detection device 60 designed as an accelerometer, and a detection device 62 designed as a pick-up sensor are depicted. Said detection devices may be used, alternatively or additionally, to reliably detect fluctuations in the longitudinal speed of the construction machine 1. Said detection devices may, however, also be omitted.

What is claimed is:

1. A self-propelled construction machine comprising:
a machine frame;
at least three travelling devices;
at least one hydraulic drive system for driving at least two of the at least three travelling devices, wherein the at least one hydraulic drive system comprises at least one controllable hydraulic motor with variable displacement volume and at least one hydraulic pump;
at least one milling drum for working ground pavement;
a detection device configured to detect fluctuations in a longitudinal speed of the construction machine during movement thereof; and
a control unit configured to
adjust the displacement volume of the at least one controllable hydraulic motor as a function of the detected fluctuations, wherein a natural frequency of the at least one hydraulic drive system of the construction machine is adjusted thereby, and
adjust a discharge volume of the at least one hydraulic pump as a function of an amount of adjustment of the displacement volume such that a specified longitudinal speed remains constant.

2. The self-propelled construction machine of claim 1, wherein the control unit adjusts the natural frequency of the construction machine by reducing the displacement volume of the at least one controllable hydraulic motor.

3. The self-propelled construction machine of claim 1, wherein the detection device is configured to detect vibration corresponding to fluctuations in the longitudinal speed of the construction machine.

4. The self-propelled construction machine of claim 3, wherein said detected vibration exhibits an essentially fixed frequency.

5. The self-propelled construction machine of claim 3, wherein the control unit is configured to control the at least one hydraulic drive system such that the displacement volume of the at least one controllable hydraulic motor is adjusted only when the detected vibration exceeds a predefined amplitude.

6. The self-propelled construction machine of claim 1, wherein the control unit is configured to control the at least one hydraulic drive system such that the displacement volume of the at least one hydraulic motor and the discharge volume of the at least one hydraulic pump are adjusted simultaneously.

7. The self-propelled construction machine of claim 1, wherein the control unit is configured to
verify whether the detected longitudinal speed deviates from the specified longitudinal speed, and
in the case of a deviation, to adjust the discharge volume of the at least one hydraulic pump until the detected longitudinal speed corresponds to the specified longitudinal speed.

8. The self-propelled construction machine of claim 1, further comprising:

a data storage device having data stored therein which show a correlation between a pressure in the at least one hydraulic drive system and speed losses; and
at least one measuring device configured to measure the pressure in the at least one hydraulic drive system,
wherein the control unit is configured to adjust the discharge volume of the at least one hydraulic pump as a function of the measured pressure such that the speed losses are compensated for and the longitudinal speed corresponds to the specified longitudinal speed.

9. The self-propelled construction machine of claim 1, wherein the detection device is configured to detect fluctuations in the longitudinal speed via one or more of:
the travelling devices;
the machine frame;
a fluctuation in volumetric flow rate; and
a fluctuation in pressure of the at least one hydraulic drive system.

10. The self-propelled construction machine of claim 9, wherein the detection device comprises one or more of:
a pick-up sensor;
an accelerometer for measuring the speed changes; and
a measuring device for measuring fluctuations in pressure or the volumetric flow rate in the at least one hydraulic drive system.

11. A method for working ground pavements using a construction machine self-propelled by means of travelling devices, in which the travelling devices are driven by a hydraulic drive system, wherein the hydraulic drive system comprises at least one controllable hydraulic motor with variable displacement volume and at least one hydraulic pump, and wherein a working device works the ground pavement, the method comprising:
detecting fluctuations in a longitudinal speed of the construction machine during movement thereof;
adjusting the displacement volume of the at least one controllable hydraulic motor as a function of the detected fluctuation, wherein a natural frequency of the hydraulic drive system of the construction machine is adjusted thereby; and
adjusting a discharge volume of the at least one hydraulic pump as a function of the amount of adjustment of the displacement volume, such that a specified longitudinal speed remains constant.

12. The method of claim 11, wherein the fluctuations in the longitudinal speed of the construction machine are detected as vibrations.

13. The method of claim 12, wherein said vibrations exhibit an essentially fixed frequency.

14. The method of claim 12, further comprising:
controlling the hydraulic drive system such that the displacement volume of the at least one controllable hydraulic motor is adjusted only when the detected vibration exceeds a predefined amplitude.

15. The method of claim 11, wherein the displacement volume of the at least one controllable hydraulic motor is reduced to adjust the natural frequency of the construction machine.

16. The method of claim 11, wherein the displacement volume of the at least one hydraulic motor and the discharge volume of the at least one hydraulic pump are adjusted simultaneously.

17. The method of claim 11, further comprising:
after adjusting the displacement volume and the discharge volume, verifying whether the detected longitudinal speed deviates from the specified longitudinal speed, and in the case of a deviation, adjusting the discharge volume of the at least one hydraulic pump until the detected longitudinal speed corresponds to the specified longitudinal speed.

18. The method of claim 11, further comprising:
after adjusting the displacement volume and the discharge volume, verifying a pressure in the hydraulic drive system and, as a function of the pressure and as a function of data stored in a data storage device which show a correlation between the pressure in the hydraulic drive system and speed losses, adjusting the discharge volume to compensate for the speed losses.

19. The method of claim 11, wherein the fluctuations in the longitudinal speed are detected via one or more of:
the travelling devices;
the machine frame;
a fluctuation in a volumetric flow rate; and
a fluctuation in a pressure of the hydraulic drive system.

\* \* \* \* \*